D. McArthur,
Casting Heads to Screws, &c.

Nº 52,790. Patented Feb. 20, 1866.

Fig. 3.a.

Witnesses:
John H. Shumway
M. A. Hine

Inventor,
Duncan McArthur
Per Atty
John E. Earls

UNITED STATES PATENT OFFICE.

DUNCAN McARTHUR, OF NEW HAVEN, CONNECTICUT, ASSIGNOR TO SARGENT & CO., OF SAME PLACE.

IMPROVED MOLD FOR CASTING HEADS UPON SCREWS, TACKS, &c.

Specification forming part of Letters Patent No. 52,790, dated February 20, 1866.

*To all whom it may concern:*

Be it known that I, DUNCAN McARTHUR, of New Haven, in the county of New Haven and State of Connecticut, have invented a new and useful Improvement in Tack and Screw Molds; and I do hereby declare the following, when taken in connection with the accompanying drawings and the letters of reference marked thereon, to be a full, clear, and exact description of the same, and which said drawings constitute part of this specification, and represent, in—

Figure 1:
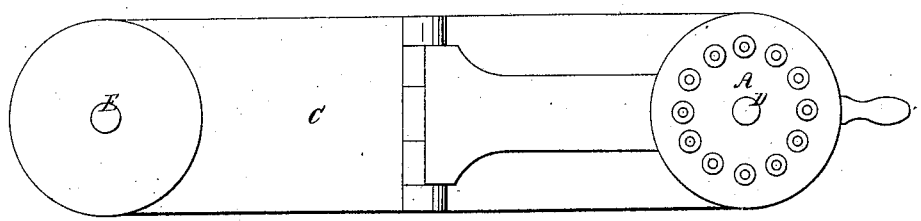
Figure 2:
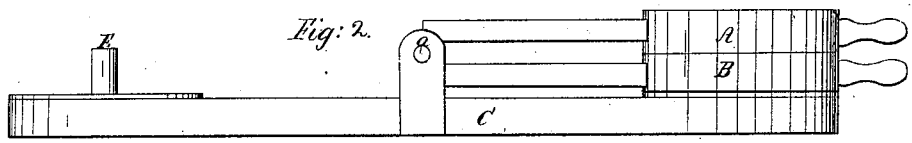
Figure 3:
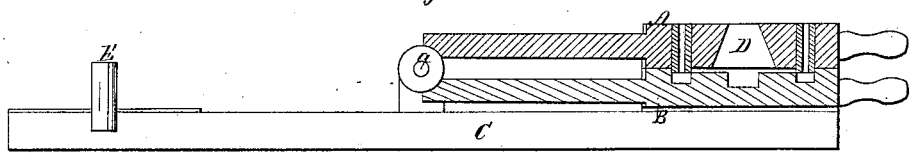
Figure 3:
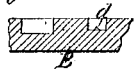
Figure 4:
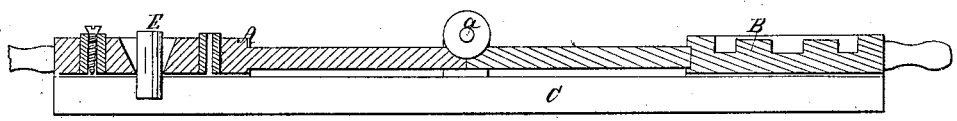
Figure 5:
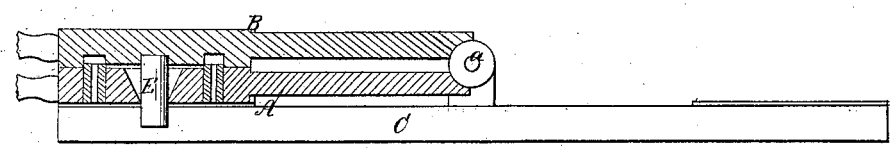
Figure 6:
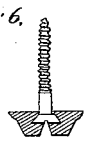
Figure 7:
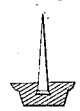

Figure 1, a top view; Fig. 2, a side view; Fig. 3, a central section, the mold in the position for forming; Fig. 4, the mold open for the insertion of the screws or tacks; Fig. 5, the mold closed preparatory to returning the mold to the position seen in Fig. 3; Figs. 6 and 7, a screw and tack as headed in my improved mold.

My invention relates to an improvement in a mold for heading screws or tacks known to the trade as "coffin screws or nails." In the molds as heretofore constructed the tacks or screws have been inserted into the mold point downward and the metal poured around the head. The top of the head being in the cope or upper part of the mold, it is impossible to form the heads with any degree of certainty, many of the heads coming from the mold in an imperfect state.

To overcome this difficulty is the object of my invention, which consists in constructing the mold in two parts, hinged together so as to be opened one from the other, or both turned over in either direction, so that the screws may be inserted in one part point downward, the other part then turned over upon the heads of the screws to secure them in the mold; then the two parts together returned, so that the point of the screw will be uppermost and the heads in the lower part of the mold, so that, in this position, when the metal is poured into the mold to form the head it will flow freely down into the mold and form around the head, and thus produce more perfect heads than in the molds as heretofore constructed.

To enable others skilled in the art to construct and use my improved mold, I will proceed to fully describe the same, as illustrated in the accompanying drawings.

A is the upper part of the mold; B, the lower part, the two parts hinged together at $a$ and upon a plate, C, so as to be turned over upon the said plate, as from the position in Fig. 2 to that in Fig. 5, or to be opened the one from the other, as seen in Fig. 4. The upper part, A, is pierced to receive the screws, as seen in Fig. 4, and in the lower part, B, forms corresponding to the holes in the upper part, to receive the metal which is to form the head of the screw. I prefer to construct the molds in a circular form, as seen in Fig. 1, the several forms gated to a center opening, D, (see Fig. 3,) through which the metal is poured to fill the forms around the head of the screws. The forms for the head in the part B should be to correspond with the shape of the head made therein, (see Figs. 6 and 7,) and if for screws a tongue, $d$, should be placed in the center of the form, as seen in Fig. $3^a$, so as to enter the groove in the head of the screw and form a slot through the metal poured therein to correspond with the slot in the head of the screw. In heading tacks this is not required.

To use my improved mold first open the mold, as seen in Fig. 4, insert screws or tacks, as the case may be, into the several holes in the said part A, as seen in Fig. 4, then turn the part B over upon the part A, as seen in Fig. 5, then turn the two parts back to the position seen in Fig. 3. If for screws, be sure that the slot of the screw rests upon the tongue $d$ in the form below it; then pour the metal through the opening D until the mold is filled; then raise the part A from the part B, (the screws and metal will cling thereto,) turn the said part A over to the position seen in Fig. 4. The stud E on the plate C will strike the metal in the mold through the opening D and force it, with the screw attached, from the mold, which leaves the mold in a position to receive more screws for a like operation. The several heads are to be removed from the gate and finished in the usual manner.

By making bushings of different sizes for the plate A, as denoted in yellow, screws or tacks of different sizes may be inserted for the same heads. The forms also may be constructed so as to be removed from the part B for change or other purpose.

It is to be understood that the mold is equally adapted either for screws or tacks or their equivalents. Therefore in using the word "screws" or "tacks," I do not confine myself to either.

Having therefore thus fully described my invention, what I claim as new and useful, and desire to secure by Letters Patent, is—

A mold consisting of the parts A and B, when hinged together upon a plate, C, so as be operated substantially in the manner as herein set forth.

DUNCAN McARTHUR.

Witnesses:
JOHN E. EARLE,
M. A. HINE.